March 19, 1968 E. F. MASALSKIS 3,373,854
FRICTION CLUTCH OPERATOR HAVING A LINKAGE SYSTEM WITH
A VARIABLE MECHANICAL ADVANTAGE
Filed Jan. 5, 1966 2 Sheets-Sheet 1

ETIENNE F. MASALSKIS
INVENTOR

BY John R. Faulkner
Donald J. Harrington
ATTORNEYS

March 19, 1968  E. F. MASALSKIS  3,373,854
FRICTION CLUTCH OPERATOR HAVING A LINKAGE SYSTEM WITH
A VARIABLE MECHANICAL ADVANTAGE
Filed Jan. 5, 1966  2 Sheets-Sheet 2
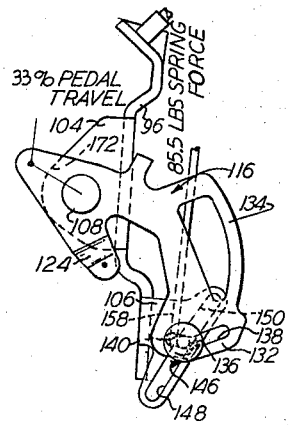
ETIENNE F. MASALSKIS
INVENTOR
BY John R. Faulkner
Donald J. Harrington
ATTORNEYS 3,373,854
Patented Mar. 19, 1968

United States Patent Office

3,373,854
FRICTION CLUTCH OPERATOR HAVING A LINKAGE SYSTEM WITH A VARIABLE MECHANICAL ADVANTAGE
Etienne F. Masalskis, Oak Park, Mich., assignor to Ford Motor Company, Dearborn, Mich., a corporation of Delaware
Filed Jan. 5, 1966, Ser. No. 518,819
8 Claims. (Cl. 192—99)

ABSTRACT OF THE DISCLOSURE

This specification describes a friction clutch mechanism having a personally operable clutch operating lever and a friction clutch disc pressure plate. The mechanical connection between the personally operable lever and the clutch pressure plate shifts the latter to a clutch disengaging position. The clutch disengaging force is opposed by a clutch linkage return spring. Provision is made for reducing the mechanical advantage of the spring as the pressure plate moves away from its clutch engaging position thereby relieving the effort required to disengage the clutch.

---

My invention relates generally to mechanically operated friction clutch mechanisms and to an improved mechanical linkage system for operating them. More particularly my invention relates to friction clutch operators for use with a selectively engageable friction clutch mechanism in an automotive vehicle driveline. Such clutch mechanisms connect and disconnect a vehicle engine crankshaft and a power input element of multiple ratio torque transmitting gearing, the power output element of which is connected to the vehicle traction wheels.

In clutch constructions of known design, a clutch flywheel housing is bolted to the crankshaft of an internal combustion engine. A friction clutch disc is splined to the power input shaft for a multiple speed ratio vehicle transmission. The friction portions of the clutch disc are situated directly adjacent to a clutch pressure plate. When pressure is applied to the pressure plate, the clutch disc is brought into frictional engagement with the flywheel housing, thereby establishing a frictional driving connection between the crankshaft and the power input shaft for the transmission. Pressure is applied to the pressure plate by clutch springs that are anchored upon the flywheel housing.

To disconnect the clutch mechanism in conventional environments of this type, there usually is provided a plurality of clutch levers that are journaled on the flywheel housing. When the levers are pivoted in one direction, their operating ends engage the clutch pressure plate and urge it out of engagement against the opposing influence of the clutch springs. The clutch levers are actuated by a clutch throw-out bearing that is mounted upon a fixed sleeve, the latter surrounding the power input shaft of the transmission. As the throw-out bearing is shifted by the vehicle operator, the pressure plate is adjusted to a release position.

The vehicle operator shifts the throw-out bearing by means of a clutch lever mechanism. This mechanism includes a foot operated clutch pedal that normally is spring biased to a clutch release position. Thus in order to disengage the clutch, the vehicle operator must apply foot pressure to the clutch pedal. That pressure progressively increases due to the spring rate of the clutch pedal return spring.

In my improved clutch construction provision is made for applying a clutch engaging force to the clutch operating levers by means of the spring that is used also in part for returning the clutch pedal operated lever mechanism to a clutch applying position. Thus the same spring force applied to the operating lever to move it to a clutch engaging position forms a portion of the spring force that must be overcome by the vehicle operator when he applies foot pressure to the clutch pedal to effect clutch disengagement.

According to a feature of my invention, I have made provision for varying the mechanical advantage of the clutch operating lever so that a foot pedal pressure in excess of that which is required to effect clutch disengagement will not be required.

It is a further object of my invention to provide a clutch operating lever of the type above set forth wherein the manual effort required to effect clutch disengagement increases from a value of zero to a predetermined maximum value as the driver operated lever mechanism is moved by the operator toward a clutch disengaging position and wherein the driver effort required to effect further adjustment of the clutch operating lever to a fully released position is relatively constant.

It is a further object of my invention to provide a clutch pedal operator of the type above set forth and which includes a driver operated lever connected to a clutch release spring at a point that is situated at precalibrated radius from the pivot point for the lever. Provision is made for varying the distance between the pivot point for the lever and the point of attachment of the return spring.

Further objects and features of my invention will become apparent from the following description and from the accompanying drawings, wherein:

FIGURE 3 shows a portion of the clutch operating linkage of my invention;

FIGURES 6, 7, 8 and 9 show a portion of the linkage mechanism of FIGURE 3 in various operating positions to illustrate the means for varying the distances between the lever pivot point and the point of attachement of the spring.

Figure 1:
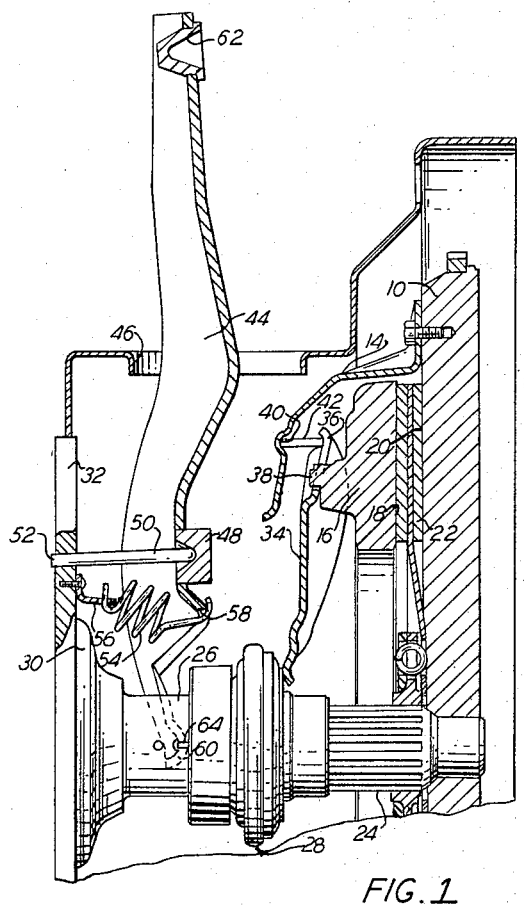
FIGURE 1 shows in cross-sectional form a friction clutch mechanism embodying the improvements of my invention.

In FIGURE 1, the engine flywheel is identified by reference character 10. It is surrounded by a bell housing 102 which can be bolted to the engine block for the internal combustion vehicle engine. Connected to the flywheel 10 by means of bolts is a flywheel housing 14 which extends radially inwardly. Situated within the enclosure defined by the housing 14 is an annular pressure plate 16 having a friction surface 18. A friction surface 20 is formed on the flywheel 10. A clutch disc 22 disposed between the friction surfaces 18 and 20 is splined at 24 to a power input shaft for a vehicle transmission having multiple ratio gearing. Situated about the splined shaft 24 is a stationary bearing support sleeve 26 upon which is slidably positioned a clutch throw-out bearing identified generally by reference character 28. Sleeve 26 is formed with a flange 30 which is bolted to a stationary wall 32 forming a part of the transmission housing.

Clutch release levers 34 extend in a generally radial direction, the inward ends thereof being engageable by the clutch throw-out bearing 28. The radially outward ends of the levers 34 are slotted as shown at 36. Received within the slots 36 are projections 38 carried by the pressure plate 16. The radially inward margin of the housing 14 is formed with a recess 40 which acts as an anchor point for reaction thrust bars 42. The ends of the bars 42 engage the radially outward ends of the levers 34.

Thus when the radially inward ends of the levers 34 are moved in a right-hand direction by the throw-out bearing 28, as viewed in FIGURE 1, the bars 42 act as a reaction point as the intermediate regions of the levers 34 apply a clutch engaging pressure to the pressure plate 16. This causes friction surfaces 18 and 20 to engage frictionally the friction disc 22 thereby establishing a driving connection between the engine crankshaft and the splined shaft 24. The end of the crankshaft, of course, is connected to the engine flywheel 10.

A clutch lever operator in the form of a yoke 44 extends outwardly through an opening 46 in the transmission bell housing. Carried at an intermediate portion of the yoke 44 is a fulcrum member 48 which is engaged by a reaction strut 50. This strut in turn is anchored at its end 52 to the wall 32. A yoke return spring 54 is situated between a spring anchor member 56, secured to the wall 32, and an eyelet 58 formed in the yoke 44. Spring 54 normally is under tension so that it applies a turning moment to the yoke 44 that tends to rotate it in a clockwise direction as viewed in FIGURE 1.

A pair of yoke fingers 60 is situated at the radially inward extremity of the yoke 44. They are engageable with the clutch throw-out bearing 28. As the yoke 44 is moved in a counterclockwise direction, the fingers 60 tend to shift the throw-out bearing 28 in a right-hand direction.

A clutch operating force is applied to the yoke 44 by a clutch operating rod that will be described with reference to FIGURE 3. This rod engages a pocket 62.

As the yoke 44 is rotated in a clockwise direction under the influence of spring 54, the clutch throw-out bearing 28 is shifted in a left-hand direction as viewed in FIGURE 1. The clutch throw-out bearing 28 is adapted to follow the motion of the end 60 of the yoke 44 by means of a riveted connection 64.

In FIGURE 3 there is shown at 66 a driver operated clutch pedal which is mounted within the vehicle passenger compartment adjacent the forward firewall 70. The pedal 66 is mounted on a clutch pedal lever 72 which is pivoted for rotation about the axis of a shaft 74. An arm 76 extends radially outwardly from shaft 74. A tension spring 78 is situated between the radially outward end of arm 76 and the stationary bracket 80 which is fixed to the stationary sheet metal wall 82 that forms a part of the vehicle body at the forward portion of the vehicle passenger compartment. The spring 78 is pretensioned thereby applying to the lever 72 a turning moment that tends to move the lever 72 in a clockwise direction. It functions as a damper spring for cushioning the return of the pedal 66 when foot pressure is relaxed. It has no appreciable affect upon clutch pedal effort. Connected also to the lever 72 is an operating arm 84. The radially outward end of arm 84 is connected to an eyelet member 86 connected to one end of a force-transmitting, flexible cable 88.

The cable 88 is received through a cable guide 90 which is held in position by means of a fixed bracket 92 secured to the wall 70. Bracket 92 is formed with an opening through which the guide 90 is received. Guide 90 extends also through a cooperating opening formed in the wall 82.

Cable 88 extends downwardly, as seen in FIGURE 3, and it is trained through a guide 94. This guide is received through an opening formed in a bracket 96 which in turn is bolted by means of bolts 98 to the bolt flange 100 of the clutch housing shown at 102. This housing is bolted to the housing 103 for a multiple speed ratio gearing mechanism.

Bracket 96 is provided with a flange 104 extending in a plane generally parallel to the axis of the engine crankshaft. Bracket 96 includes also a flange 106 that is positioned generally parallel to flange 104.

Figure 4:
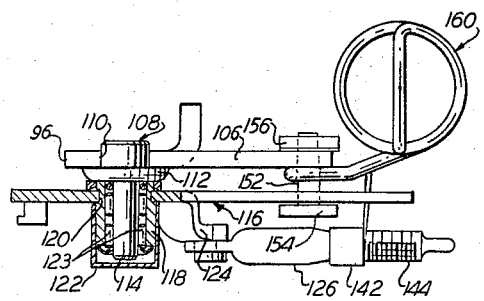
FIGURE 4 is a plan view of the structure of FIGURE 3.
Figure 2:
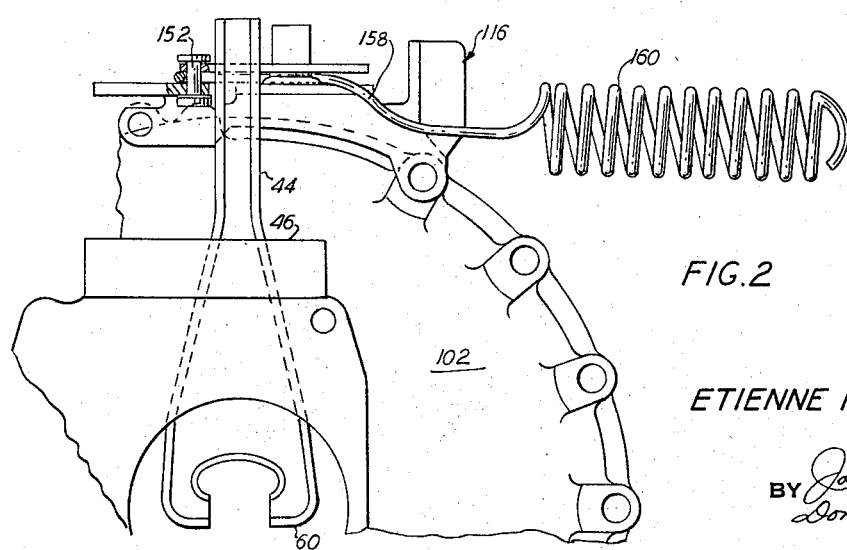
FIGURE 2 shows the structure of FIGURE 1 as viewed in the direction of the axis of the clutch of FIGURE 1.

As best seen in FIGURE 4, a supporting pin 108 is received through an opening 110 in the bracket 96 and is held in place by means of a force fit. Pin 108 is provided with a shoulder 112.

The shank 114 of pin 108 provides a support for a lever assembly 116. A sleeve 118 surrounds shank 114 and is positioned within an opening 120 formed in the lever assembly 116. A needle bearing assembly 123 is used to journal the sleeve 118 on the shank 114. The needle bearing assembly and the sleeve 118 are covered by a dust cover 122.

The lever assembly 116 includes an arm 124 extending radially from the pin 108. A strut 126 in the front of a tubular thrust element is connected at one end to the arm 124. The thrust element 126 is flattened, as indicated in FIGURES 3 and 4, to facilitate a pinned connection with the arm 124. The flattened portion is provided with an elongated aperture 128 through which is received a pin 130 carried by the arm 124. This arm is offset from the plane of the main body of the lever assembly 116 as indicated in FIGURE 4.

Lever assembly 116 includes also an arm 132 which is defined in part by a reinforcing structural web 134. The extremity of the arm 132 is formed with a slot 136 having separate portions 138 and 140 that are arranged at an angle with respect to each other.

The right-hand end of the strut 126, as viewed in FIGURE 3, is formed with a reduced diameter and is received in an internally threaded sleeve 142. Secured within the sleeve 142 is an etxernally threaded thrust element 144 which is adapted to register with the pocket 62 of the yoke 44.

The flange 106 of the bracket 96 is formed with an elongated slot 146. It includes a first part 148 and a second part 150, each part being disposed at a separate predetermined angle with respect to a common reference line in the plane of the flange 106.

When the lever assembly 116 is positioned as shown in FIGURE 3, the slot portion 140 becomes aligned with slot portion 150. A reaction pin 152 or cam element is received through these aligned slot portions as indicated best in FIGURE 4. Pin 152 is formed with a relatively large flat head 154 to provide a bearing action between the pin 152 and the adjacent surface of the lever assembly 116. A flat washer 156 is adjacent the stationary flange 106 of the bracket 96. The inner end of 158 of a coil spring 160 is looped over the pin 152. This end 158 is situated between flange 106 and the arm 132 of the lever assembly 116.

Spring 160 includes multiple coils. At the uppermost end of the coils the end 162 is looped over a spring seat member 164, which in turn is secured to a fixed portion of the clutch housing by means of bolts.

The lower end of the pull cable 88 is connected to eyelet element 166. This element includes an elongated opening 168 through which is received a pin 170 carried by an arm 172 of the lever assembly 116.

Arm 116 is situated on the side of the axis of pin 108 opposite to the position of arm 124.

When the vehicle operator presses the pedal 66 to disengage the clutch, the cable 88 is drawn upwardly by the arm 84. This causes the lever assembly 116 to rotate in a clockwise direction about the axis of the pin 108. This causes the strut 126 to move in a left-hand direction, which relieves the pressure on the end of the yoke 44. The yoke 44 thereby is permitted to move about the fulcrum strut 50 in a clockwise direction as viewed in FIGURE 1. The spring 54 provides the necessary retracting force on the yoke 44.

As the lever assembly 116 rotates in a clockwise direction, the pin 152 moves along the slot portion 140. Pin 152 moves also initially along slot portion 150 formed in the stationary flange 106. Thus the pin 152 is caused to be displaced relative to a fixed point. This increases the spring force of the spring 160. Normally there is a preload of about 74 pounds on the spring 160 upon movement of the lever assembly 116 in a clockwise direction. However, the spring load increases as the pin 152 is displaced along the slot 146.

Figure 5:
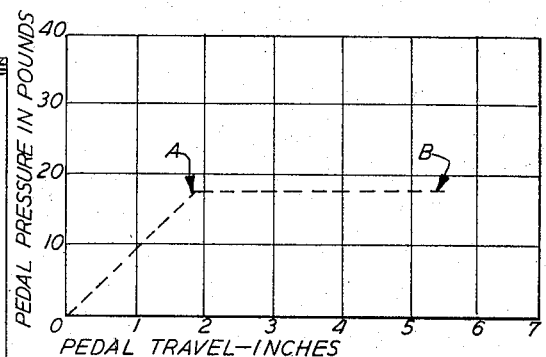
FIGURE 5 is a chart showing the clutch pedal force variation for each increment of clutch pedal travel.

FIGURE 5 shows in graphic form the relationship between pedal travel in inches and the pedal pressure in pounds. During the initial pre-travel from the zero point to point A, the pedal pressure increases substantially linearly to a value of approximately 18 pounds. This force corresponds to a spring force that is sufficient to maintain the clutch fully engaged for normal driving operation. When the clutch pedal is relaxed, the force of the spring 160 urges the lever assembly 116 to a clutch engaging position.

When the force necessary to maintain the clutch in the fully engaged position is exceeded, there is no necessity for the clutch pedal effort to increase. At this time the pin enters the slot portion 148 and the slot portion 138. The pin 152 then is caused to move closer to the center of rotation of the lever assembly 116. The spring force continues to increase as the lever assembly 116 is rotated from a position corresponding to point A in FIGURE 5 to a position corresponding to point B, but the pedal effort required to effect rotation of the lever assembly 116 in this oerating range does not increase because of the decrease in the moment arm between the point of rotation and the point of attachment of the spring end 158. The geometry of the slots 146 and 136 can be calibrated to provide the desired pedal effort for any given pedal displacement.

In FIGURES 6, 7, 8 and 9, I have shown the various operating positions for the lever assembly 116. The length of the effective lever arm between the axis of the pin 108 and the line of action of the spring when the lever assembly 116 assumes a position shown in FIGURE 6 is 2.53 inches. This corresponds to a spring force of 85.5 pounds. Upon continued rotation of the lever assembly 116, it assumes the position shown in FIGURE 7 where the line of action of the spring is displaced 2.33 inches from the center of rotation. At that time, however, the spring force is 96 pounds. It will be noted that the pin 152, when the lever assembly 116 assumes the position shown in FIGURE 7, leaves the slot portion 140 and begins to enter the slot portion 138. When the lever assembly 116 assumes the position shown at FIGURE 6, the pin 152 leaves the slot portion 150 and begins to enter the slot portion 148.

When the lever assembly 116 assumes the position shown in FIGURE 8, the pin 152 is received within slot portions 148 and 138 at an intermediate location. When the lever assembly 116 assumes the extreme position shown in FIGURE 9, the pin 152 is at the ends of the slot portions 148 and 138. At that time the line of action of the spring is displaced only 2.03 inches from the center of rotation while the spring force is 110 pounds. The corresponding moment arm and the corresponding force for the position shown in FIGURE 8 are 2.18 inches and 103 pounds, respectively.

After the lever assembly 116 assumes the position shown in FIGURE 7 as it is rotated in a clockwise direction, the pedal effort required to move the lever assembly remains constant. It increases, however, as the lever assembly 116 moves from the position shown in FIGURE 6 to the position shown in FIGURE 7.

Having thus described a preferred form of my invention, what I claim and desire to secure by U.S. Letters Patent is:

1. In a friction clutch mechanism adapted to establish a driving connection between a driving member and a driven member, a friction surface connected to said driving member, a friction disc connected to said driven member, a pressure plate adjacent said disc and having a friction surface formed thereon, first lever means for applying a clutch engaging force to said pressure plate thereby establishing a driving connection between said driving member and said driven member through said clutch disc, a clutch bearing mounted concentrically with respect to said driven member and engageable with an operating end of said first lever means, second lever means having an operating lever extending outwardly from the axis of said driven member with its innermost end engageable with said clutch bearing, means for pivoting said second lever means on a stationary portion of said mechanism, a clutch pedal operated lever assembly mounted for rotation about a fixed axis, a spring anchored at one point and connected at another point to said lever assembly, and a force transmitting connection between said lever assembly and the outward end of said second lever means whereby a clutch operating force is applied to said second lever means upon rotation of said lever assembly in one direction under the influence of said spring, the connection with said spring including a cammed surface carried by said lever assembly and a cam element registering said cammed surface, a guide slot formed in said stationary portion, said cam element registering with said guide slot, said other point of said spring being connected to said cam element whereby the effective distance between the center of rotation of said lever assembly and the line of action of said spring decreases upon rotation of said lever assembly in the opposite direction as said guide slot moves said cam element about the pivoting axis of said second lever means.

2. In a friction clutch mechanism adapted to establish a driving connection between a driving member and a driven member, a friction surface connected to said driving member, a friction disc connected to said driven member, a pressure plate adjacent said disc and having a friction surface formed thereon, first lever means for applying a clutch engaging force to said pressure plate thereby establishing a driving connection between said driving member and said driven member through said clutch disc, a clutch bearing mounted concentrically with respect to said driven member and engageable with an operating end of said first lever means, second lever means having an operating lever extending outwardly from the axis of said driven member with its innermost end engageable with said clutch bearing, means for pivoting said second lever means on the stationary portion of said mechanism, a clutch pedal operated lever assembly mounted for rotation about a fixed axis, a spring anchored at one point and connected at another point to said lever assembly, and a force transmitting connection between said lever assembly and the outward end of said second lever means whereby a clutch operating force is applied to said second lever means upon rotation of said lever assembly in one direction under the influence of said spring, said lever assembly including an elongated slot, a stationary bracket having one portion thereof situated in a plane generally parallel to the plane of said lever assembly, a second elongated slot formed in said stationary bracket with a portion thereof registering with said first slot, a pin received through each of said slots, said other spring point being connected to said pin, the distance between the center of rotation of said lever assembly and said pin being variable as said lever assembly is rotated.

3. In a friction clutch mechanism adapted to establish a driving connection between a driving member and a driven member, a friction surface connected to said driving member, a friction disc connected to said driven member, a pressure plate adjacent said disc and having a friction surface formed thereon, first lever means for applying a clutch engaging force to said pressure plate thereby establishing a driving connection between said driving member and said driven member through said clutch disc, a clutch bearing mounted concentrically with respect to said driven member and engageable with an operating end of said first lever means, second lever means having an operating lever extending outwardly from the axis of said driven member with its innermost end engageable with said clutch bearing, means for pivoting said second lever means on the stationary portion of said mechanism, a clutch pedal operated lever assembly mounted for rotation about a fixed axis, a spring anchored at one point and connected at another point to said lever assembly, a force transmitting connection between said lever assembly and the outward end of said second lever means whereby a clutch operating force is applied to said second lever means upon rotation of said lever assembly in one direction under the influence of said spring, the connection between said lever assembly and said spring comprising a first elongated slot formed in said lever assembly at a location relatively remotely situated with respect to the center of rotation of said lever assembly, a stationary bracket, and a second elongated slot formed in said stationary bracket in registry with said first elongated slot, a reaction pin received through said registering slots, said other spring point being connected to said reaction pin, said first elongated slot having separate portions extending in separate directions with respect to each other whereby the distance between said pin and the center of rotation of said lever assembly decreases upon movement of said lever assembly against the imposing influence of said spring.

4. In a friction clutch mechanism adapted to establish a driving connection between a driving member and a driven member, a friction surface connected to said driving member, a friction disc connected to said driven member, a pressure plate adjacent said disc and having a friction surface formed thereon, first lever means for applying a clutch engaging force to said pressure plate thereby establishing a driving connection between said driving member and said driven member through said clutch disc, a clutch bearing mounted concentrically with respect to said driven member and engageable with an operating end of said first lever means, second lever means having an operating lever extending outwardly from the axis of said driven member with its innermost end engageable with said clutch bearing, means for pivoting said second lever means on the stationary portion of said mechanism, a clutch pedal operated lever assembly mounted for rotation about a fixed axis, a spring anchored at one point and connected at another point to said lever assembly, a force transmitting connection between said lever assembly and the outward end of said second lever means whereby a clutch operating force is applied to said second lever means upon rotation of said lever assembly in one direction under the influence of said spring, the connection between said spring and said lever assembly comprising a first elongated slot formed in said lever assembly, a stationary bracket, a second elongated slot formed in said bracket, a reaction pin extending through said slots, said other point of said spring being connected to said reaction pin, the geometry of each slot being calibrated to provide a variable effective distance between the line of action of said spring and the center of rotation of said lever assembly as the lever assembly is rotated against the opposing influence of said spring to a clutch disengaging position.

5. In a friction clutch mechanism adapted to establish a driving connection between a driving member and a driven member, a friction surface connected to said driving member, a friction disc connected to said driven member, a pressure plate adjacent said disc and having a friction surface formed thereon, first lever means for applying a clutch engaging force to said pressure plate thereby establishing a driving connection between said driving member and said driven member through said clutch disc, a clutch bearing mounted concentrically with respect to said driven member and engageable with an operating end of said first lever means, second lever means having an operating lever extending outwardly from the axis of said driven member with its innermost end engageable with said clutch bearing, means for pivoting said second lever means on a stationary portion of said mechanism, a clutch pedal operated lever assembly mounted for rotation about a fixed axis, a spring anchored at one point and connected at another point to said lever assembly, a force transmitting connection between said lever assembly and the outward end of said second lever means whereby a clutch operating force is applied to said second lever means upon rotation of said lever assembly in one direction under the influence of said spring, the connection with said spring including a cammed surface carried by said lever assembly, a cam element registering with said cammed surface, a guide slot formed in said stationary portion, said cam element registering with said guide slot, said other end of said spring being connected to said cam element whereby the effective distance between the center of rotation of said lever assembly and the line of action of said spring decreases upon rotation of said lever assembly in the opposite direction as said guide slot moves said cam element about the pivoting axis of said second lever means, a personally operable clutch pedal lever, and a force transmitting cable connecting said pedal lever to said lever assembly at a location situated on one side of the axis of rotation of said lever assembly, the force transmitted to said lever assembly by said spring being at a location situated at the opposite side of the axis of rotation of said lever assembly.

6. In a friction clutch mechanism adapted to establish a driving connection between a driving member and a driven member, a friction surface connected to said driving member, a friction disc connected to said driven member, a pressure plate adjacent said disc and having a friction surface formed thereon, first lever means for applying a clutch engaging force to said pressure plate thereby establishing a driving connection between said driving member and said driven member through said clutch disc, a clutch bearing mounted concentrically with respect to said driven member and engageable with an operating end of said first lever means, second lever means having an operating lever extending outwardly from the axis of said driven member with its innermost end engageable with said clutch bearing, means for pivoting said second lever means on the stationary portion of said mechanism, a clutch pedal operated lever assembly mounted for rotation about a fixed axis, a spring anchored at one point and connected at another point to said lever assembly, a force transmitting connection between said lever assembly and the outward end of said second lever means whereby a clutch operating force is applied to said second lever means upon rotation of said lever assembly in one direction under the influence of said spring, said lever assembly having an elongated slot, a stationary bracket having one portion thereof situated in a plane generally parallel to the plane of said lever assembly, a second elongated slot formed in said stationary bracket with a portion thereof registering with said first slot, a pin received through each of said slots, said other point of said spring being connected to said pin, the distance between the center of rotation of said lever assembly and said pin being variable as said lever assembly is rotated, and a personally operable clutch pedal lever, the force transmitting connection between said pedal lever to said lever assembly being at a location situated on one side of the axis of rotation of said lever assembly, the spring force supplied to said lever assembly being at a location situated at the opposite side of the axis of rotation of said lever assembly.

7. In a friction clutch mechanism adapted to establish a driving connection between a driving member and a driven member, a friction surface connected to said driving member, a friction disc connected to said driven member, a pressure plate adjacent said disc and having a friction surface formed thereon, first lever means for applying a clutch engaging force to said pressure plate thereby establishing a driving connection between said driving member and said driven member through said clutch disc, a clutch bearing mounted concentrically with respect to said driven member and engageable with an operating end of said first lever means, second lever means having an operating lever extending outwardly from the axis of said driven member with its innermost end engageable with said clutch bearing, means for pivoting said second lever means on the stationary portion of said mechanism, a clutch pedal operated lever assembly mounted for rotation about a fixed axis, a spring anchored at one point and connected at another point to said lever assembly, a force transmitting connection between said lever assembly and the outward end of said second lever means whereby a clutch operating force is applied to said second lever means upon rotation of said lever assembly in one direction under the influence of said spring, a connection between said lever assembly and said spring comprising a first elongated slot formed in said lever assembly at a location relatively remotely situated with respect to the center of rotation of said lever assembly, a stationary bracket, a second elongated slot formed in said stationary bracket in registry with said first elongated slot, a reaction pin received through said registering slots, said inner end of said spring being connected to said reaction pin, said first elongated slot having separate portions extending in different directions with respect to each other whereby the distance between said pin and the center of rotation of said lever assembly decreases upon movement of said lever assembly against the opposing influence of said spring, a personally operable clutch pedal lever, a force transmitting cable connecting said lever to said lever assembly at a location situated on one side of the axis of rotation of said lever assembly, the spring force being transmitted to said lever assembly at a location thereon situated at the opposite side of the axis of rotation of said lever assembly.

8. In a friction clutch mechanism adapted to establish a driving connection between a driving member and a driven member, a friction surface connected to said driving member, a friction disc connected to said driven member, a pressure plate adjacent said disc and having a friction surface formed thereon, first lever means for applying a clutch engaging force to said pressure plate thereby establishing a driving connection between said driving member and said driven member through said clutch disc, a clutch bearing mounted concentrically with respect to said driven member and engageable with an operating end of said first lever means, second lever means having an operating lever extending outwardly from the axis of said driven member with its innermost end engageable with said clutch bearing, means for pivoting said second lever means on the stationary portion of said mechanism, a clutch pedal operated lever assembly mounted for rotation about a fixed axis, a spring anchored at one point and connected at another point to said lever assembly, a force transmitting connection between said lever assembly and the outward end of said second lever means whereby a clutch operating force is applied to said second lever means upon rotation of said lever assembly in one direction under the influence of said spring, the connection between said spring and said lever assembly comprising a first elongated slot formed in said lever assembly, a stationary bracket, a second elongated slot formed in said bracket, a reaction pin extending through said slots, said other end of said spring being connected to said reaction pin, the geometry of each slot being calibrated to provide a variable effective distance between the line of action of said spring and the center of rotation of said lever assembly as the lever assembly is rotated against the imposing influence of said spring to a clutch disengaging position, a personally operable clutch pedal lever, a force transmitting cable connecting said lever to said lever assembly at a location situated on one side of the axis of rotation of said lever assembly, the spring force transmitted to said lever assembly being at a location thereon situated at the opposite side of the axis of rotation of said lever assembly.

References Cited

UNITED STATES PATENTS

| 1,999,262 | 4/1935 | Tenney | 192—99 |
| 2,170,172 | 8/1939 | Wemp | 192—99 |
| 2,239,968 | 4/1941 | Meech | 192—99 X |
| 2,296,535 | 9/1942 | Nutt | 192—99 |
| 2,321,513 | 6/1943 | Reed | 192—99 |
| 3,254,748 | 6/1966 | Smirl | 192—99 |

DONLEY J. STOCKING, *Primary Examiner.*

CARLTON R. CROYLE, *Examiner.*

A. T. McKEON, *Assistant Examiner.*